United States Patent
Takahashi et al.

(10) Patent No.: US 12,193,032 B2
(45) Date of Patent: Jan. 7, 2025

(54) TERMINAL AND RADIO COMMUNICATION METHOD

(71) Applicant: NTT DOCOMO, INC., Tokyo (JP)

(72) Inventors: Yuki Takahashi, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/769,221

(22) PCT Filed: Oct. 16, 2020

(86) PCT No.: PCT/JP2020/039011
§ 371 (c)(1),
(2) Date: Apr. 14, 2022

(87) PCT Pub. No.: WO2021/075522
PCT Pub. Date: Apr. 22, 2021

(65) Prior Publication Data
US 2024/0121795 A1    Apr. 11, 2024

(30) Foreign Application Priority Data
Oct. 17, 2019    (JP) .............................. 2019-190156

(51) Int. Cl.
*H04W 72/23*    (2023.01)
*H04L 5/00*    (2006.01)
*H04W 72/232*    (2023.01)

(52) U.S. Cl.
CPC ......... *H04W 72/232* (2023.01); *H04L 5/0094* (2013.01)

(58) Field of Classification Search
CPC .......................... H04W 72/232; H04L 5/0094
See application file for complete search history.

(56) References Cited

U.S. PATENT DOCUMENTS

2020/0092073 A1*    3/2020    Papasakellariou .... H04L 5/0094

OTHER PUBLICATIONS

International Search Report issued in PCT/JP2020/039011 on Dec. 15, 2020 (1 page).
Written Opinion of the International Searching Authority issued in PCT/JP2020/039011 on Dec. 15, 2020 (3 pages).
(Continued)

*Primary Examiner* — Brenda H Pham
(74) *Attorney, Agent, or Firm* — Osha Bergman Watanabe & Burton LLP

(57) ABSTRACT

Appropriate PDCCH monitoring is performed even when carrier aggregation is applied. A terminal according to one aspect of the present disclosure includes: a transmitting section that transmits capability information related to the number of downlink cells where Physical Downlink Control Channel (PDCCH) candidates can be monitored; and a control section that determines, based on the capability information, the number of cells where PDCCH monitoring can be performed for New Radio (NR) of a second release, the number of the cells being different from the number of cells where PDCCH monitoring can be performed for NR of a first release.

3 Claims, 6 Drawing Sheets

(56) References Cited

OTHER PUBLICATIONS

3GPP TS 38.213 V15.7.0; "3rd Generation Partnership Project; Technical Specification Group Radio Access Network; NR; Physical layer procedures for control (Release 15)"; Sep. 2019 (108 pages).
Qualcomm Incorporated; "PDCCH Enhancements for eURLLC"; 3GPP TSG-RAN WG1 Meeting #98b, R1-1911118; Chongqing, China; Oct. 14-20, 2019 (14 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

\* cited by examiner

TERMINAL AND RADIO COMMUNICATION METHOD

TECHNICAL FIELD

The present disclosure relates to a terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of a larger capacity and higher sophistication than those of LTE (Third Generation Partnership Project (3GPP) Releases (Rel.) 8 and 9), LTE-Advanced (3GPP Rel. 10 to 14) has been specified.

LTE successor systems (also referred to as, for example, the 5th generation mobile communication system (5G), 5G+(plus), New Radio (NR) or 3GPP Rel. 15 or subsequent releases) are also studied.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

According to Rel. 15 NR, a maximum number of Physical Downlink Control Channel (PDCCH) candidates and a maximum number of non-overlapped Control Channel Elements (CCEs) to be monitored per slot of one serving cell are specified to suppress an increase in a processing load of a UE.

Furthermore, PDCCH monitoring in a span unit is studied for Rel. 16 NR. A span configuration in 1 slot may be referred to as a span pattern.

However, study on details of a span pattern in a case where carrier aggregation is used has not yet advanced. Furthermore, study on a limitation of the number of times of BD/the number of CCEs in a case where spans are used has not yet advanced, either. Unless these details and limitation are clearly specified, there is a risk that it is not possible to suitably monitor a PDCCH, and a communication throughput lowers.

It is therefore one of objects of the present disclosure to provide a terminal and a radio communication method that can perform appropriate PDCCH monitoring even when carrier aggregation is applied.

Solution to Problem

A terminal according to one aspect of the present disclosure includes: a transmitting section that transmits capability information related to the number of downlink cells where Physical Downlink Control Channel (PDCCH) candidates can be monitored; and a control section that determines, based on the capability information, the number of cells where PDCCH monitoring can be performed for New Radio (NR) of a second release, the number of the cells being different from the number of cells where PDCCH monitoring can be performed for NR of a first release.

Advantageous Effects of Invention

According to one aspect of the present disclosure, it is possible to perform appropriate PDCCH monitoring even when carrier aggregation is applied.

Figure 1:
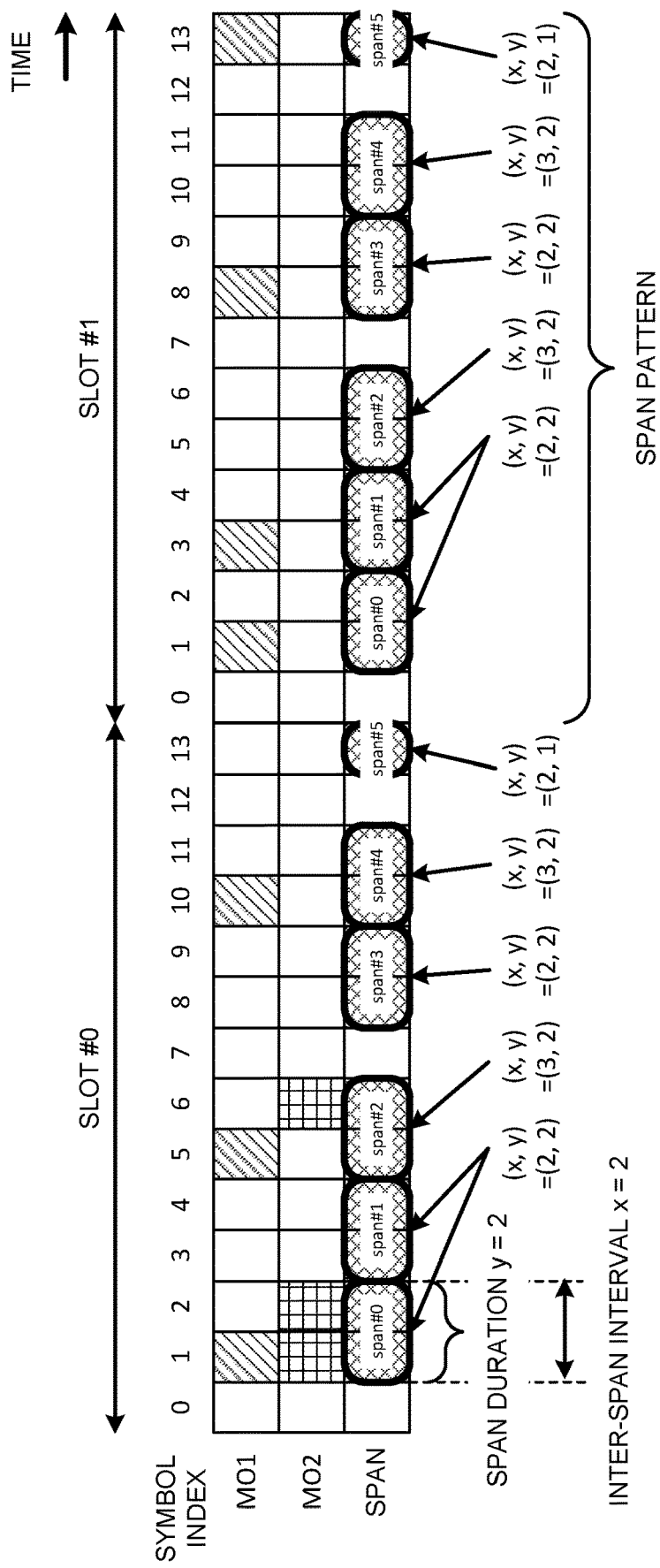
FIG. 1 is a diagram illustrating one example of spans and span patterns.

DESCRIPTION OF EMBODIMENTS (Maximum Number of PDCCH Candidates/Maximum Number of CCEs to be Monitored)

It is demanded for NR to apply a plurality of numerologies and control communication. For example, it is assumed for NR to apply a plurality of SubCarrier Spacings (SCSs) based on, for example, a frequency band, and perform transmission and reception. SCSs used by NR are, for example, 15 kHz, 30 kHz, 60 kHz, 120 kHz and 240 kHz. Naturally, applicable SCSs are not limited to these.

In addition, a numerology (SCS) may be associated with a given index $\mu$. For example, $\mu=0$ may indicate SCS=15 kHz, $\mu=1$ may indicate SCS=30 kHz, $\mu=2$ may indicate SCS=60 kHz, and $\mu=3$ may indicate SCS=120 kHz. In addition, these numbers are examples, and values are not limited to these.

According to NR, a maximum number of times of decoding (e.g., Blind Decoding (BD)) performed by a UE per slot of one serving cell is studied to suppress, for example, an increase in a processing load of the UE. The maximum number of times of BD may be interchangeably read as, for example, a maximum number of PDCCH candidates or an upper limit of the number of times of BD monitored by the UE.

Furthermore, for a similar reason, a maximum number of non-overlapped Control Channel Elements (CCEs) per slot of one serving cell is studied. The maximum number of CCEs may be interchangeably read as, for example, an upper limit of the number of CCEs.

A maximum number $M^{max,slot,\mu}_{PDCCH}$ of PDCCH candidates to be monitored per slot of one serving cell may be $M^{max,slot,0}_{PDCCH}=44$ (44 in a case of SCS=15 kHz), $M^{max,slot,1}_{PDCCH}=36$ (36 in a case of SCS=30 kHz), $m^{max,slot,2}{}_{PDCCH}$=22 (22 in a case of SCS=60 kHz), and $M^{max,slot, 3}{}_{PDCCH}$=20 (20 in a case of SCS=120 kHz). In addition, these numbers are examples, and values are not limited to these.

A maximum number $C^{max,slot,\mu}{}_{PDCCH}$ of non-overlapped CCEs per slot of one serving cell may be $C^{max,slot,0}{}_{PDCCH}$=56 (56 in a case of SCS=15 kHz), $C^{max,slot,1}{}_{PDCCH}$=56 (56 in a case of SCS=30 kHz), $C^{max,slot,2}{}_{PDCCH}$=48 (48 in a case of SCS=60 kHz), and $C^{max,slot,1}{}_{PDCCH}$=32 (32 in a case of SCS=120 kHz). In addition, these numbers are examples, and values are not limited to these.

In a non-CA case, an upper limit of the number of times of BD and an upper limit of the number of CCEs for a Downlink Bandwidth Part (DL BWP) having an SCS configuration $\mu$ (e.g., $\mu$=0 to 3) are above $M^{max,slot,\mu}{}_{PDCCH}$ and $C^{max,slot,\mu}{}_{PDCCH}$, respectively.

The UE may report capability information (higher layer parameter "pdcch-BlindDetectionCA") that indicates that the UE has capability for monitoring PDCCH candidates for $N^{cap}{}_{cells}$ downlink cells to a base station. In this regard, $N^{cap}{}_{cells}$ may be an integer equal to or more than 4.

In a case where the UE is configured with $N^{DL,\mu}{}_{cells}$ downlink cells including DL BWPs having the SCS configurations $\mu$, and $\Sigma^{3}{}_{\mu=0}(N^{DL,\mu}{}_{cells})\leq 4$ or $\Sigma^{3}{}_{\mu=0}(N^{DL,\mu}{}_{cells})\leq N^{cap}{}_{cells}$ holds, an upper limit $M^{total, slot, \mu}{}_{PDCCH}$ of the number of times of BD and an upper limit $C^{total, slot, \mu}{}_{PDCCH}$ of the number of CCEs for each scheduled cell are above $M^{max, slot, \mu}{}_{PDCCH}$ and $C^{max, slot, \mu}{}_{PDCCH}$, respectively.

In this regard, $N^{DL,\mu}{}_{cells}$ may correspond to the number of configured downlink cells (that may be referred to as Component Carriers (CCs)) including the DL BWPs having the SCS configurations 11.

In a case where the UE is configured with the $N^{DL,\mu}{}_{cells}$ downlink cells including the DL BWPs having the SCS configurations $\mu$ (e.g., $\mu$=0 to 3), and $\Sigma^{3}{}_{\mu=0}(N^{DL,\mu}{}_{cells})>N^{cap}{}_{cells}$ holds, it is not necessary to monitor more than ($M^{max, slot, \mu}{}_{PDCCH}$, $M^{total, slot, \mu}{}_{PDCCH}$) PDCCH candidates for each scheduled cell in an active DL BWP having the SCS configuration $\mu$ of a scheduling cell.

That is, in this case, an upper limit of the number of times of BD per certain SCS configuration $\mu$ and per slot may be min ($M^{max, slot, \mu}{}_{PDCCH}$, $M^{total, slot, \mu}{}_{PDCCH}$). Furthermore, an upper limit of the number of CCEs per certain SCS configuration $\mu$ and per slot may be min($C^{max, slot, \mu}{}_{total}$, $C^{total, slot, \mu}{}_{PDCCH}$).

[Mathematical 1]

In this regard, (Equation 1)

$$M_{PDCCH}^{total,slot,\mu} = \left\lfloor N_{cells}^{caps} \cdot M_{PDCCH}^{max,slot,\mu} \cdot N_{cells}^{DL,\mu} / \sum_{j=0}^{3} N_{cells}^{DL,j} \right\rfloor$$

(Equation 2)

$$C_{PDCCH}^{total,slot,\mu} = \left\lfloor N_{cells}^{cap} \cdot C_{PDCCH}^{max,slot,\mu} \cdot N_{cells}^{DL,\mu} / \sum_{j=0}^{3} N_{cells}^{DL,j} \right\rfloor$$

Description made so far complies with a current specification of Rel. 15 NR.

(PDCCH Monitoring Span)

The above-described conventional upper limits of the number of times of BD/the number of CCEs are values per slot. However, taking a use case such as Ultra Reliable and Low Latency Communications (URLLC) into account, it is preferable to define the upper limits of the number of times of BD/the number of CCEs in a shorter unit instead of a slot unit.

Hence, according to Rel. 16 NR, Orthogonal Frequency Division Multiplexing (OFDM) symbol-based or span-based monitoring capability (the upper limits of the number of times of BD/the number of CCEs) is studied.

A PDCCH monitoring span (that may be referred to simply as, for example, a span or an MS) may be defined such that the number of contiguous Orthogonal Frequency Division Multiplexing (OFDM) symbols is up to Y (i.e., Y or less), and a minimum time separation between starts of two spans is X symbols. In this regard, the "span" in the present disclosure may be read as, for example, a symbol set for PDCCH monitoring, a symbol set or a duration based on a PDCCH Monitoring Offset (MO) (or a duration derived based on the MO).

Each span may be included in 1 slot. Furthermore, each span may not overlap each other. A span configuration in 1 slot or in a plurality of slots may be referred to as a span pattern. The span pattern may be read as at least one of a span combination, a span set and a span group. The same span pattern may be repeated in each slot, or the same span pattern may be repeated in units of a plurality of slots.

Regarding one span, a time difference between a start position (symbol) of the span and a start position of a neighboring (e.g., subsequent or previous) span may be represented by x. A length (in other words, a duration) of one span may be represented by y.

The length (in other words, a span duration) y of one span may be a maximum value between a maximum value among lengths of all CORESETs and a minimum value among candidate values of Y reported by the UE. In addition, a last span in a slot may be smaller than this length (the maximum value between the maximum value among the lengths of all CORESETs and the minimum value among the candidate values of Y reported by the UE).

Although an interval between contiguous spans may not be equal, all spans included in a certain span pattern need to satisfy the same (X, Y) limitation. That is, the UE may determine a span pattern for an arbitrary span of the certain span pattern such that x≥X is satisfied and y≤Y is satisfied.

A PDCCH Monitoring Offset (MO) may be completely included in 1 span.

A case where a span alignment (in other words, a span pattern) satisfies at least one gap interval of a set of candidate values of (X, Y) reported by the UE in each slot (including a cross slot boundary, too) may be read as that a specific PDCCH monitoring configuration satisfies a UE capability limitation.

The UE may transmit a set of candidate values of (X, Y) as UE capability information by using a higher layer parameter (e.g., "pdcch-MonitoringAnyOccasionsWithSpanGap" of an RRC parameter). For example, the set of the candidate values of (X, Y) may be, for example, set 1={(7, 3)}, set 2={(4, 3), (7, 3)}, or set 3={(2, 2), (4, 3), (7, 3)}.

The number of different start symbol indices of spans for all MOs per slot may not be larger than floor(14/{minimum value among candidate values of X reported by UE}). In this regard, floor(A) means a floor function of A.

FIG. 1 is a diagram illustrating one example of spans and span patterns. This example assumes that the UE has reported the above set 3 as the set of the candidate values of (X, Y). Furthermore, the UE is configured with MO configurations associated with an MO 1 and an MO 2, and FIG. 1 illustrates respective MO timings of these configurations.

The MO 1 corresponds to symbols #1, #5 and #10 of a slot #0, and symbols #1, #3, #8 and #13 of a slot #1. The MO 2 corresponds to symbols #1, #2 and #6 of the slot #0. In addition, this example assumes that an intra-slot position of an MO in a slot other than the slot #0 and the slot #1 overlaps one of these symbols.

When symbols of an arbitrary slot are part of at least one MO, the UE may determine these symbols as part of a certain span. The UE determines start positions and lengths of one or a plurality of spans of each slot based on configured MOs (the MO 1 and the MO 2 in this case) and a reported set (the set 3 in this case) of candidate values of (X, Y) such that span patterns are the same in all slots.

The UE may try whether or not it is possible to create a span pattern such that x≥X is satisfied and y≤Y is satisfied by using (X, Y) selected in a specific order in the set of candidate values of (X, Y). The UE may try to create a span pattern by using a span pattern when the UE can create this span pattern, or by using next (X, Y) when the UE cannot create the span pattern. The specific order may be, for example, an ascending order (a trial is made in order from smallest X) or a descending order (a trial is made in order from largest X) of X.

In a case in FIG. 1, symbols that make up a span include at least symbols (symbols #1, #2, #3, #5, #6, #8, #10 and #13) associated with an arbitrary MO. When the UE tries whether or not it is possible to create a span pattern such that x≥X is satisfied and y≤Y is satisfied in a case where X is minimum (X, Y)=(2, 2) in the set 3, the UE could have created a span pattern including six spans (spans #0 to #5) in 1 slot as illustrated in FIG. 1.

In this regard, the span #0 corresponds to the symbols #1 and #2, the span #1 corresponds to symbols #3 and #4, the span #2 corresponds to symbols #5 and #6, the span #3 corresponds to symbols #8 and #9, the span #4 corresponds to symbols #10 and #11, and the span #5 corresponds to the symbol #13. In addition, this span pattern is one example, and different span patterns may be created under the same condition.

In FIG. 1, the spans #0, #1 and #3 are each associated with (x, y)=(2, 2). The spans #2 and #4 are associated with (x, y)=(3, 2). The span #5 is associated with (x, y)=(2, 1) (in this regard, a start time difference between a span of the slot #0 and a span of the slot #1 may be also taken into account for x). Hence, this span pattern satisfies a restriction of (X, Y)=(2, 2). A span pattern that satisfies a restriction of certain (X, Y)=(i, j) (i and j are real numbers in this case) may be referred to as a span pattern (i, j).

A case where the span pattern satisfies a certain combination (X, Y) may be read as that this combination (that may be expressed as C (X, Y)) is valid. Furthermore, maximum C among valid combinations may be applied.

In addition, in the same carrier, the UE may be configured with PDCCH monitoring based on Rel. 15 capability for high speed and large volume communication (enhanced Mobile Broad Band (eMBB)), and PDCCH monitoring based on Rel. 16 capability for URLLC. The UE may monitor a PDCCH for eMBB according to the reported Rel. 15 capability, and monitor a PDCCH for URLLC according to the reported Rel. 16 capability.

Furthermore, in the same carrier, the UE may be configured with both of PDCCH monitoring for eMBB and for URLLC based on one of the Rel. 15 capability and the Rel. 16 capability. The base station may configure which capability is used for the UE.

Regarding PDCCH monitoring capability of Rel. 16, an upper limit C of a maximum number of non-overlapped CCEs for channel estimation per monitoring span may be the same over different spans in 1 slot. Furthermore, each span for Rel. 16 may cover at least one of a UE-specific search space set and a common search space set for URLLC. In addition, a value of the upper limit C is not limited to a value specified by Rel. 15, and may be smaller than, may be the same as or may be larger than the value.

However, study on details of a span pattern in a case where carrier aggregation is used (a plurality of CCs are configured) has not yet advanced. Furthermore, study on a limitation of the number of times of BD/the number of CCEs in a case where spans are used has not yet advanced, either. Furthermore, study on capability information has not yet advanced, either. Unless these details and limitation are clearly specified, there is a risk that it is not possible to suitably monitor a PDCCH, and a communication throughput lowers.

Hence, the inventors of the present disclosure have conceived a method for performing appropriate PDCCH monitoring even when carrier aggregation is applied.

Embodiments according to the present disclosure will be described in detail below with reference to the drawings. A radio communication method according to each embodiment may be each applied alone, or may be applied in combination.

In addition, the present disclosure will describe an example where the index μ related to a numerology (SCS) can take a value equal to or more than 0 and equal to or less than 3. However, a value of 11 is not limited to this. For example, in a case where μ can take a value equal to or more than 0 and equal to or less than N (N is an integer), an aspect where a constant "3" related toll in the present disclosure is read as this "N" may be applied.

(Radio Communication Method)

First Embodiment

The first embodiment relates to a span pattern in a case where a plurality of CCs are configured to a UE. In addition, a CC may be interchangeably read as, for example, a cell or a carrier in the present disclosure.

The span pattern may be the same over all CCs.

The span pattern may differ between a plurality of CCs. The span pattern may always differ in a case where CCs are different, and may differ in a case where CCs are different and a specific condition is satisfied.

The specific condition may correspond to at least one of followings:

(1) A Frequency Range (FR) of each of a plurality of CCs is different,
(2) A frequency band of each of a plurality of CCs is different,
(3) A cell group to which each of a plurality of CCs belongs is different, and
(4) A numerology (e.g., subcarrier spacing) of each of a plurality of CCs is different.

Regarding above (1), for example, a span pattern (7, 3) may be used for a carrier #0 in an FR 1, and another span pattern (4, 3) may be used for a carrier #1 in an FR 2.

Regarding above (2), for example, the span pattern (7, 3) may be used for the carrier #0 in a band n1, and the another span pattern (4, 3) may be used for the carrier #1 in a band n2. In this regard, n1 and n2 described herein may indicate band indices for identifying bands.

Regarding above (3), for example, the span pattern (7, 3) may be used for the carrier #0 in a master cell group (or a cell group #0), and the another span pattern (4, 3) may be used for the carrier #1 in a secondary cell group (or a cell group #1).

Regarding above (4), for example, the span pattern (7, 3) may be used for the carrier #0 for which data is scheduled at a subcarrier spacing=15 kHz, and the another span pattern (4, 3) may be used for the carrier #1 for which data is scheduled at a subcarrier spacing=30 kHz.

The UE may determine a span pattern of each CC based on a certain assumption related to span patterns of a plurality of CCs. The UE may assume that a span pattern corresponds to at least one of the above-described span patterns in the first embodiment, and determine a span pattern of each CC based on the assumption.

When, for example, assuming that the span patterns of a plurality of CCs are the same, the UE may determine a span pattern of one CC of a plurality of these CCs, and use the determined span pattern as a span pattern of another CC.

When assuming that the span patterns of a plurality of CCs are different in a case where a specific condition is satisfied, the UE may determine span patterns individually for one or more CCs (e.g., CCs of different FRs) that satisfy the specific condition among a plurality of these CCs. The UE may determine a span pattern for one CC of one or more CCs (e.g., CCs of the same FR) that do not satisfy the specific condition among a plurality of these CCs, and use the determined span pattern as span patterns of the rest of CCs.

According to the above-described first embodiment, even when a plurality of CCs are used by carrier aggregation or dual connectivity, the UE can appropriately determine a span pattern of each CC.

Second Embodiment

The second embodiment relates to an upper limit C of a maximum number of non-overlapped CCEs.

The second embodiment is roughly classified into a limitation of slot unit-based CA (that may be referred to simply as a slot-based CA limitation) based on an upper limit $C^{total,slot,\mu}_{PDCCH}$ of the number of CCEs per slot (embodiment 2-1), and a limitation of span unit-based CA (that may be referred to simply as a span-based CA limitation) based on an upper limit $C^{total,slot,\mu}_{PDCCH, span}$ of the number of CCEs per span (embodiment 2-2).

In this regard, regarding a non-CA limitation (limitation per serving cell), $C^{total,slot,\mu}_{PDCCH}$ (slot-based non-CA limitation) similar to legacy Rel. 15 may be applied, $C^{total,slot,\mu}_{PDCCH, span}$ (span-based non-CA limitation) that is a maximum number of non-overlapped CCEs (an upper limit of the number of CCEs) per certain SCS configuration $\mu$ and per span may be applied, or $C^{total,slot,\mu,i}_{PDCCH, span}$ (span-based non-CA limitation) that is a maximum number of non-overlapped CCEs per certain SCS configuration $\mu$, per CC of a CC index i and per span may be applied.

In this regard, $C^{total,slot,\mu}_{PDCCH, span}$ may be expressed as $C^{total,slot,\mu}_{PDCCH}$, or may be expressed in other ways. Furthermore, $C^{total,slot,\mu,(,i)}_{PDCCH, span}$ may be expressed as $C^{max, span, \mu(,i)}_{PDCCH}$, or may be expressed in other ways.

For a plurality of spans in a certain span pattern or slot, $C^{max, slot, \mu(,i)}_{PDCCH, span}$ may be applied the same value, or may be applied a different value (e.g., a different value may be applied according to (x, y) associated with a span). The same applies to $C^{total, slot, \mu}_{PDCCH, span}$, too.

Whether to use the slot-based non-CA limitation or to use the span-based non-CA limitation as the non-CA limitation may be specified in advance by a specification, or may be configured to a UE by a higher layer signaling.

In the present disclosure, the higher layer signaling may be one or a combination of, for example, a Radio Resource Control (RRC) signaling, a Medium Access Control (MAC) signaling and broadcast information.

For example, an MAC Control Element (MAC CE) and an MAC Protocol Data Unit (PDU) may be used for the MAC signaling. The broadcast information may be, for example, a Master Information Block (MIB), a System Information Block (SIB), Remaining Minimum System Information (RMSI) and Other System Information (OSI).

Whether to use the slot-based non-CA limitation or to use the span-based non-CA limitation as the non-CA limitation may differ per numerology (SCS). For example, the UE may be configured to apply the span-based non-CA limitation to relatively small $\mu$ (e.g., $\mu \leq 1$) and apply the slot-based non-CA limitation to other $\mu$ (e.g., $\mu \geq 2$), and may make decision in this way.

[Slot-Based CA Limitation]

An SCS without the span-based non-CA limitation may be applied the above-described CA limitation of Rel. 15.

The SCS with the span-based non-CA limitation may be applied at least one of an SCS-based limitation (embodiment 2-1-1) and a CC-based limitation (embodiment 2-1-2). In this regard, this SCS-based limitation may mean that same $C^{max, slot, \mu}_{PDCCH}$ or $C^{total, slot, \mu}_{PDCCH}$ is applied to different CCs. Furthermore, this CC-based limitation may mean that different $C^{max, slot, \mu}_{PDCCH}$ or $C^{total, slot, \mu}_{PDCCH}$ are applied to different CCs. This CC-based limitation may mean the SCS and CC-based limitations.

Embodiment 2-1-1

According to embodiment 2-1-1, in a case of $N^{cap}_{cells} < \Sigma^{3}_{\mu=0}(N^{DL,\mu}_{cells})$, the CA limitation may be applied. In this case, an upper limit of the number of CCEs per SCS configuration $\mu$ and per slot may be $\min(C^{max, slot, \mu}_{PDCCH}, C^{total, slot, \mu}_{PDCCH})$.

In this regard, $C^{max, slot, \mu}_{PDCCH}$ may be one of followings:
$C^{max, slot, \mu}_{PDCCH}$=average value of $C^{max, slot, \mu}_{PDCCH, span}$×number of spans in 1 slot, and
$C^{max, slot, \mu}_{PDCCH}$=specific value (e.g., minimum value or maximum value) of $C^{max, slot, \mu}_{PDCCH, span}$ in a plurality of CCs x number of spans in 1 slot.

The above-described "average value of $C^{max, slot, \mu}_{PDCCH, span}$" may mean an average value of $C^{max, slot, \mu}_{PDCCH, span}$ in a plurality of CCs, may mean an average value of $C^{max, slot, \mu}_{PDCCH, span}$ in 1 slot in one certain CC, and may mean an average value of $C^{max, slot, \mu}_{PDCCH, span}$ in 1 slot in a plurality of CCs.

$C^{total, slot, \mu}_{PDCCH}$ may be calculated by applying above-described $C^{max, slot, \mu}_{PDCCH}$ to equation 2.

In embodiment 2-1-1, in a case of $N^{cap}_{cells} \geq \Sigma^{3}_{\mu=0}(N^{DL,\mu}_{cells})$, the non-CA limitation may be applied. This non-CA limitation may be the above-described non-CA limitation (slot-based non-CA limitation) of Rel. 15, or may be the span-based non-CA limitation.

In embodiment 2-1-1, for example, a span pattern may be decided based on (4) in the first embodiment.

Embodiment 2-1-2

According to embodiment 2-1-2, in a case of $N^{cap}_{cells} < \Sigma^{3}_{\mu=0}(N^{DL,\mu}_{cells})$, the CA limitation may be applied. In this case, an upper limit of the number of CCEs per SCS configuration $\mu$, per CC and per slot may be $\min(C^{max, slot, \mu, i}{}_{PDCCH}, C^{total, slot, \mu, i}{}_{PDCCH})$. In this regard, i represents an index of a CC. This $C^{total, slot, \mu, i}{}_{PDCCH}$ may be calculated according to following equation 3.

[Mathematical 2]

$$C_{PDCCH}^{total,slot,\mu,i} = \left\lfloor N_{cells}^{cap} \cdot C_{PDCCH}^{max,slot,\mu} \cdot N_{cells}^{DL,\mu,i} / \sum_{j=0}^{3} N_{cells}^{DL,j} \right\rfloor \quad \text{(Equation 3)}$$

In this regard, $N^{DL, \mu, i}{}_{cells}$ may mean the number of cells (e.g., 1) whose CC indices correspond to i among downlink cells including DL BWPs having the SCS configurations μ.

Furthermore, $C^{max, slot, \mu}{}_{PDCCH}$ may be one of followings:

$C^{max, slot, \mu}{}_{PDCCH}$=average value of $C^{max, slot, \mu, i}{}_{PDCCH, span}$ of all serving cells×number of spans in 1 slot, $C^{max, slot, \mu}{}_{PDCCH}$=specific value (e.g., minimum value or maximum value) of $C^{max, slot, \mu, i}{}_{PDCCH, span}$ in a plurality of CCs×number of spans in 1 slot, and $C^{max, slot, max, \mu}{}_{PDCCH}$=value of $C^{max, slot, \mu, i}{}_{PDCCH, span}$ in specific CC (e.g., CC of minimum CC index or CC of maximum CC index among configured CCs)×number of spans in 1 slot.

The average value of $C^{max, slot, \mu, i}{}_{PDCCH, span}$ of the all serving cells may be calculated according to following equation 4.

[Mathematical 3]

$$\frac{\sum_{i=0} \left(\sum_{j=0}^{3} N_{cells}^{DL,j} - 1\right) C_{PDCCH,span}^{max,slot,\mu,i}}{\sum_{j=0}^{3} N_{cells}^{DL,j}} \quad \text{(Equation 4)}$$

In embodiment 2-1-2, in a case of $N^{cap}{}_{cells} \geq \Sigma^{3}{}_{\mu=0}(N^{DL, \mu}{}_{cells})$, the non-CA limitation may be applied. This non-CA limitation may be the above-described non-CA limitation (slot-based non-CA limitation) of Rel. 15, or may be the span-based non-CA limitation.

In embodiment 2-1-2, for example, a span pattern may be decided based on at least one rule in the first embodiment.

[Span-Based CA Limitation]

The span-based CA limitation may be applied to an SCS with the span-based non-CA limitation. The span-based CA limitation may be applied at least one of the SCS-based limitation (embodiment 2-2-1) and the CC-based limitation (embodiment 2-2-2). In addition, this SCS-based limitation may mean that same $C^{max, slot, \mu}{}_{PDCCH, span}$ or $C^{total, slot, \mu}{}_{PDCCH, span}$ is applied to different CCs. Furthermore, this CC-based limitation may mean that different $C^{max, slot, \mu}{}_{PDCCH, span}$ or $C^{total, slot, \mu}{}_{PDCCH, span}$ may be applied to different CCs. This CC-based limitation may mean the SCS and CC-based limitations.

Embodiment 2-2-1

In embodiment 2-2-1, in a case of $N^{cap}{}_{cells} \leq \Sigma^{3}{}_{\mu=0}(N^{DL, \mu}{}_{cells})$, the CA limitation may be applied. In this case, an upper limit of the number of CCEs per certain SCS configuration μ and per span may be $\min(C^{max, slot, \mu}{}_{PDCCH, span}, C^{total, slot, \mu}{}_{PDCCH, span})$. This $C^{total, slot, \mu}{}_{PDCCH, span}$ may be calculated according to following equation 5.

[Mathematical 4]

$$C_{PDCCH,span}^{total,slot,\mu} = \left\lfloor N_{cells}^{cap} \cdot C_{PDCCH,span}^{max,slot,\mu} \cdot N_{cells}^{DL,\mu} / \sum_{j=0}^{3} N_{cells}^{DL,j} \right\rfloor \quad \text{(Equation 5)}$$

In addition, an upper limit $C^{total, slot, \mu, i}{}_{PDCCH, span}$ of the number of CCEs per span of a cell of a cell index i may be derived based on equation 4 according to following equation 6.

[Mathematical 5]

$$C_{PDCCH,span}^{total,slot,\mu,i} = \lfloor C_{PDCCH,span}^{total,slot,\mu} / N_{cells}^{DL,\mu} \rfloor (i=0, \ldots, N_{cells}^{DL,\mu}-1) \quad \text{(Equation 6)}$$

$C^{total, slot, \mu, i}{}_{PDCCH, span}$ may be derived by using equation 7 obtained by integrating equation 5 and equation 6.

[Mathematical 6]

$$C_{PDCCH,span}^{total,slot,\mu,i} = \left\lfloor N_{cells}^{cap} \cdot C_{PDCCH,span}^{max,slot,\mu} \cdot 1 / \sum_{j=0}^{3} N_{cells}^{DL,j} \right\rfloor \quad \text{(Equation 7)}$$

$(i = 0, \ldots, N_{cells}^{DL,\mu} - 1)$

The UE may decide the number of CCEs to be monitored in each CC based on the upper limit $C^{total, slot, \mu, i}{}_{PDCCH, span}$ of the number of CCEs per span that takes all CCs into account, and the upper limit $C^{total, slot, \mu, i}{}_{PDCCH, span}$ of the number of CCEs per span of a CC that can use $C^{total, slot, \mu, i}{}_{PDCCH, span}$.

In embodiment 2-2-1, in a case of $N^{cap}{}_{cells} \geq \Sigma^{3}{}_{\mu=0}(N^{DL, \mu}{}_{cells})$, the non-CA limitation may be applied. This non-CA limitation may be the above-described non-CA limitation (slot-based non-CA limitation) of Rel. 15, or may be the span-based non-CA limitation.

In embodiment 2-2-1, for example, a span pattern may be decided based on (4) in the first embodiment.

Embodiment 2-2-2

In embodiment 2-2-2, in a case of $N^{cap}{}_{cells} \leq \Sigma^{3}{}_{\mu=0}(N^{DL, \mu}{}_{cells})$, the CA limitation may be applied. In this case, an upper limit of the number of CCEs per SCS configuration μ, per CC and per slot may be $\min(C^{max, slot, \mu, i}{}_{PDCCH, span}, C^{total, slot, \mu, i}{}_{PDCCH, span})$. In this regard, i represents an index of a CC. This $C^{total, slot, \mu, i}{}_{PDCCH, span}$ may be calculated according to following equation 8.

[Mathematical 7]

$$C_{PDCCH,span}^{total,slot,\mu,i} = \left\lfloor N_{cells}^{cap} \cdot C_{PDCCH,span}^{max,slot,\mu} \cdot N_{cells}^{DL,\mu,i} / \sum_{j=0}^{3} N_{cells}^{DL,j} \right\rfloor \quad \text{(Equation 8)}$$

In this regard, $N^{DL, \mu, i}{}_{cells}$ may mean the number of cells (e.g., 1) whose CC indices correspond to i among downlink cells including DL BWPs having the SCS configurations μ.

Furthermore, $C^{max, slot, \mu}{}_{PDCCH, span}$ may be one of followings:

$C^{max, slot, \mu}{}_{PDCCH, span}$=average value of $C^{max, slot, \mu, i}{}_{PDCCH, span}$ of all serving cells (that may be calculated according to above-described equation 4), $C^{max, slot, \mu}{}_{PDCCH, span}$=specific value (e.g., minimum value or maximum value) of $C^{max, slot, \mu, i}{}_{PDCCH, span}$ in a plurality of CCs, and $C^{max,\,slot,\,\mu}_{PDCCH,\,span}$=value of $C^{max,\,slot,\,\mu,\,i}_{PDCCH,\,span}$ in specific CC (e.g., CC of minimum CC index or CC of maximum CC index among configured CCs).

Furthermore, $C^{max,\,slot,\,\mu,\,i}_{PDCCH,\,span}$ may be calculated according to following equation 9.

[Mathematical 8]

$$C^{total,slot,\mu,i}_{PDCCH,span} = \left[ \left( \sum_{k=0}^{N^{cap}_{cells}-1} C^{max,slot,\mu,selected\ kth\ value}_{PDCCH,span} \right) \cdot N^{DL,\mu,i}_{cells} / \sum_{j=0}^{3} N^{DL,j}_{cells} \right]$$

(Equation 9)

In this regard, a "selected kth value" indicates a kth value among $N^{cap}_{cells}$ CC indices selected by the UE from CC indices of i=0 or more and $N^{DL,\,\mu,\,i}_{cells}-1$ or less.

In addition, the UE may select the $N^{cap}_{cells}$ CC indices that correspond to one of followings:

The $N^{cap}_{cells}$ CC indices from a smallest (or largest) CC index among $C^{max,\,slot,\,\mu,\,i}_{PDCCH,\,span}$ of all serving cells, and The $N^{cap}_{cells}$ CC indices from a smallest (or largest) CC index among configured CC indices.

In embodiment 2-2-2, in a case of $N^{cap}_{cells} \geq \sum_{\mu=0}^{3}(N^{DL,\,\mu}_{cells})$, the non-CA limitation may be applied. This non-CA limitation may be the above-described non-CA limitation (slot-based non-CA limitation) of Rel. 15, or may be the span-based non-CA limitation.

In embodiment 2-2-2, for example, a span pattern may be decided based on at least one rule in the first embodiment.

According to the above-described second embodiment, the UE can appropriately decide the CA limitation related to the number of CCEs.

<Others>

Each of the above-described embodiments has described the upper limit of the number of CCEs, yet is not limited to this. By, for example, reading the upper limit of the number of CCEs as an upper limit of the number of times of BD, and reading an arbitrary parameter C* (such as $C^{total,\,slot,\,\mu}_{PDCCH}$, or $C^{max,\,slot,\,\mu,\,i}_{PDCCH,\,span}$) PDCCH or related to the upper limit of the number of CCEs as a corresponding parameter M* (such as $M^{total,\,slot,\,\mu}_{PDCCH}$ or $M^{max,\,slot,\,\mu,\,i}_{PDCCH,\,span}$) related to the upper limit of the number of times of BD, the present disclosure covers a CA limitation related to M, too.

In addition, the UE configured with PDCCH monitoring based on (Rel. 15) capability for eMBB and PDCCH monitoring based on (Rel. 16) capability for URLLC in the same carrier may decide the upper limit of the number of CCEs and the upper limit of the number of times of BD according to the second embodiment (replacement of the second embodiment) for monitoring related to URLLC service, or may decide the upper limit of the number of CCEs and the upper limit of the number of times of BD according to an Rel. 15 rule for monitoring related to eMBB service.

Furthermore, the UE configured with both of PDCCH monitoring for eMBB and for URLLC based on one of the Rel. 15 capability and the Rel. 16 capability in the same carrier may decide the upper limit of the number of CCEs and the upper limit of the number of times of BD according to the second embodiment (and replacement of the second embodiment) for monitoring related to both of the URLLC and eMBB services.

In addition, the UE may report capability information (e.g., higher layer parameter "pdcch-BlindDetectionCA-r16") specified by Rel. 16 or subsequent release NR different from capability information (higher layer parameter "pdcch-BlindDetectionCA") specified by Rel. 15 NR as the capability information that indicates the number $N^{cap}_{cells}$ of downlink cells that can monitor PDCCH candidates to the network. For example, pdcch-BlindDetectionCA may indicate the number of cells supported by Rel. 15 NR, and pdcch-BlindDetectionCA-r16 may indicate the number of cells supported by Rel. 16 or subsequent release NR. In this case, $N^{cap}_{cells}$ according to each of the above-described embodiments may correspond to a value reported by the capability information specified by these Rel. 16 and subsequent releases.

The UE may report capability information (also referred to as joint capability information) that indicates both of the number of cells supported by Rel. 15 NR and the number of cells supported by Rel. 16 or subsequent release NR in a joint manner (in other words, as one information) as the capability information that indicates the number $N^{cap}_{cells}$ of downlink cells that can monitor PDCCH candidates to the network.

When the UE reports joint capability information that indicates a certain value $N^{cap}_{cells}$, the UE may apply a value obtained by multiplying this certain value with a given number (that may be an integer or a real number such as 1 time, 2 times or 0.5 times) to PDCCH monitoring for certain release (e.g., Rel. 15 or Rel. 16) NR.

Figure 2A:
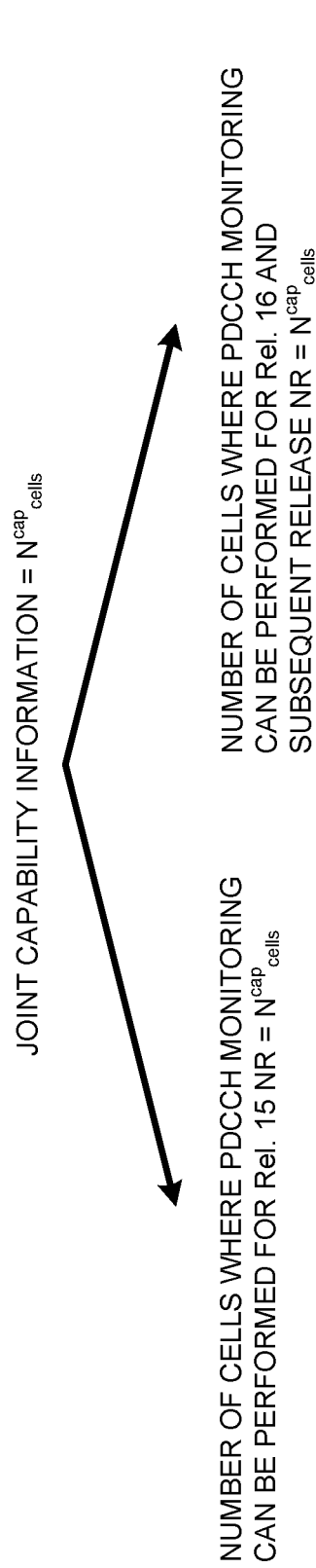
FIGS. 2A and 2B are diagrams illustrating one example where the number of cells that can perform PDCCH monitoring for NR of each release is determined based on joint capability information.

When reporting the joint capability information that indicates $N^{cap}_{cells}$, the UE may assume that a total number of serving cells in which the UE can monitor PDCCHs is $2*N^{cap}_{cells}$. This "2" may be read as the number of NR releases supported by the UE. When, for example, the UE reports the joint capability information that indicates $N^{cap}_{cells}$ as illustrated in FIG. 2A, it may be indicated that the number of cells in which the UE can perform PDCCH monitoring for Rel. 15 NR is $N^{cap}_{cells}$, and the number of cells in which the UE can perform PDCCH monitoring for Rel. 16 NR is $N^{cap}_{cells}$.

For example, it may be assumed for the UE that reports joint capability information that indicates $N^{cap}_{cells}=4$ that the number of cells in which the UE can perform PDCCH monitoring for Rel. 15 NR is 4, and the number of cells in which the UE can perform PDCCH monitoring for Rel. 16 NR is 4. That is, the UE may support PDCCH monitoring of 8 cells in total.

The joint capability information may indicate a total number of cells that can perform PDCCH monitoring for each release NR. When reporting the joint capability information that indicates $N^{cap}_{cells}$, the UE may divide $N^{cap}_{cells}$ by a certain rate (e.g., same rate) for the number of cells that can perform PDCCH monitoring for each release NR.

Figure 2B:
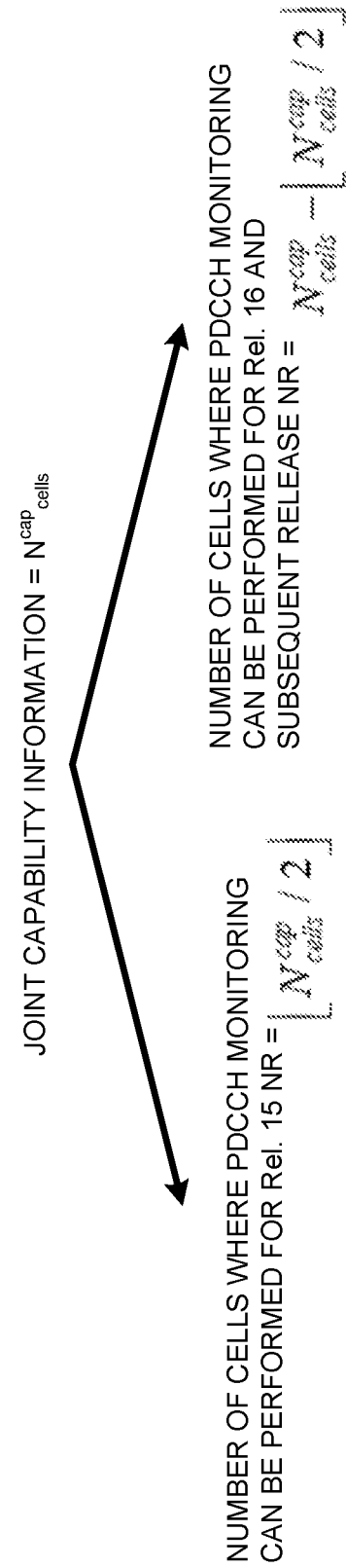

For example, it may be assumed for the UE that reports joint capability information that indicates $N^{cap}_{cells}=8$ that, when the rate is 1/2 (=0.5), the number of cells in which the UE can perform PDCCH monitoring for Rel. 15 NR is floor($N^{cap}_{cells}/2$)=4, and the number of cells in which the UE can perform PDCCH monitoring for Rel. 16 NR is $N^{cap}_{cells}$—floor($N^{cap}_{cells}/2$)=4 as illustrated in FIG. 2B.

When the joint capability information indicates a total number of cells that can perform PDCCH monitoring for each release NR, the UE may derive a larger number of cells that can perform PDCCH monitoring for Rel. 15 than the number of cells that can perform PDCCH monitoring for other release NR, or vice versa. According to this configuration, it is possible to secure multiple PDCCH monitoring for certain specific release NR to achieve stability of control.

In addition, the rate may be may be defined in advance as a fixed value by a specification, or may be determined by the UE based on a higher layer signaling (e.g., RRC signaling), a physical layer signaling (e.g., DCI) or a combination of these signalings. The value of the rate may be notified by the joint capability information. Furthermore, the value of the rate may be determined or configured per corresponding release.

When reporting the number of cells that can perform PDCCH monitoring for Rel. 16 NR described herein by using individual capability information or joint capability information, the UE may assume to apply control or CA limitation based on a span pattern described in the above-described embodiments. In addition, even when control or CA limitation based on a span pattern described in the above-described embodiments is not applied, the UE may report the number of cells that can perform PDCCH monitoring for Rel. 16 NR described herein by using the individual capability information or the joint capability information.

In addition, in the present disclosure, the number of cells indicated by $N^{cap}_{cells}$ may indicate the number of serving cells that can monitor PDCCHs, or the number of cells that is configured to the UE that can monitor PDCCHs. In the present disclosure, a serving cell may be interchangeably read as a cell to be configured.

In addition, "Rel. 15 NR" in the above description related to the capability information that indicates $N^{cap}_{cells}$ may be read as a specific use case (or a service type or a bearer) (e.g., eMBB). "Rel. 16 or subsequent release NR" may be read as "Rel. 16 NR" or may be read as another specific use case (or a service type or a bearer) (e.g., URLLC).

(Radio Communication System)

The configuration of the radio communication system according to one embodiment of the present disclosure will be described below. This radio communication system uses one or a combination of the radio communication method according to each of the above embodiments of the present disclosure to perform communication.

Figure 3:
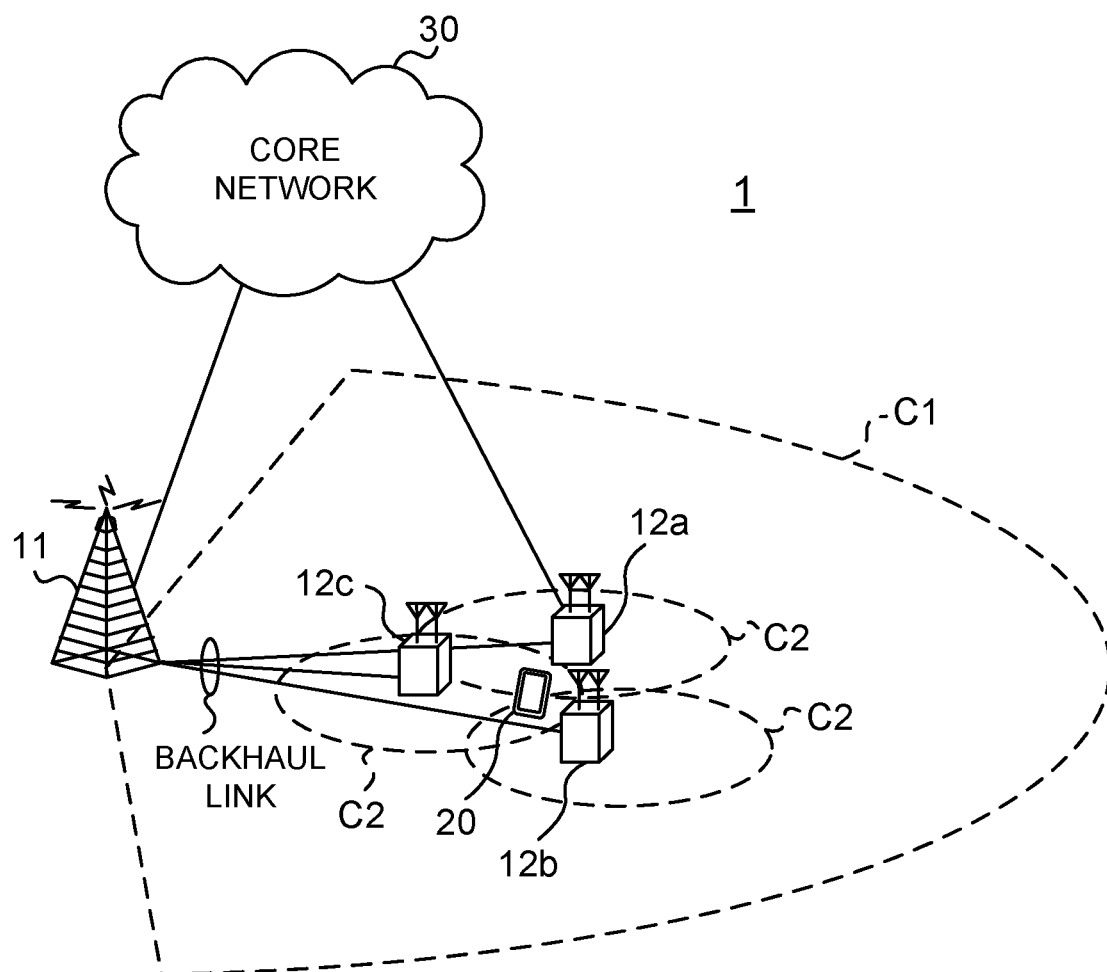
FIG. 3 is a diagram illustrating one example of a schematic configuration of a radio communication system according to one embodiment.

FIG. 3 is a diagram illustrating one example of a schematic configuration of the radio communication system according to the one embodiment. A radio communication system 1 may be a system that realizes communication by using Long Term Evolution (LTE) or the 5th generation mobile communication system New Radio (5G NR) specified by the Third Generation Partnership Project (3GPP).

Furthermore, the radio communication system 1 may support dual connectivity between a plurality of Radio Access Technologies (RATs) (Multi-RAT Dual Connectivity (MR-DC)). MR-DC may include dual connectivity (E-UTRA-NR Dual Connectivity (EN-DC)) of LTE (Evolved Universal Terrestrial Radio Access (E-UTRA)) and NR, and dual connectivity (NR-E-UTRA Dual Connectivity (NE-DC)) of NR and LTE.

According to EN-DC, a base station (eNB) of LTE (E-UTRA) is a Master Node (MN), and a base station (gNB) of NR is a Secondary Node (SN). According to NE-DC, a base station (gNB) of NR is an MN, and a base station (eNB) of LTE (E-UTRA) is an SN.

The radio communication system 1 may support dual connectivity between a plurality of base stations in an identical RAT (e.g., dual connectivity (NR-NR Dual Connectivity (NN-DC)) where both of the MN and the SN are base stations (gNBs) according to NR).

The radio communication system 1 may include a base station 11 that forms a macro cell C1 of a relatively wide coverage, and base stations 12 (12a to 12c) that are located in the macro cell C1 and form small cells C2 narrower than the macro cell C1. The user terminal 20 may be located in at least one cell. An arrangement and the numbers of respective cells and the user terminals 20 are not limited to the aspect illustrated in FIG. 3. The base stations 11 and 12 will be collectively referred to as a base station 10 below when not distinguished.

The user terminal 20 may connect with at least one of a plurality of base stations 10. The user terminal 20 may use at least one of Carrier Aggregation (CA) and Dual Connectivity (DC) that use a plurality of Component Carriers (CCs).

Each CC may be included in at least one of a first frequency range (Frequency Range 1 (FR 1)) and a second frequency range (Frequency Range 2 (FR 2)). The macro cell C1 may be included in the FR 1, and the small cell C2 may be included in the FR 2. For example, the FR 1 may be a frequency range equal to or less than 6 GHz (sub-6 GHz), and the FR 2 may be a frequency range higher than 24 GHz (above-24 GHz). In addition, the frequency ranges and definitions of the FR 1 and the FR 2 are not limited to these, and, for example, the FR 1 may correspond to a frequency range higher than the FR 2.

Furthermore, the user terminal 20 may perform communication by using at least one of Time Division Duplex (TDD) and Frequency Division Duplex (FDD) in each CC.

A plurality of base stations 10 may be connected by way of wired connection (e.g., optical fibers compliant with a Common Public Radio Interface (CPRI) or an X2 interface) or radio connection (e.g., NR communication). When, for example, NR communication is used as a backhaul between the base stations 11 and 12, the base station 11 corresponding to a higher station may be referred to as an Integrated Access Backhaul (IAB) donor, and the base station 12 corresponding to a relay station (relay) may be referred to as an IAB node.

The base station 10 may be connected with a core network 30 via the other base station 10 or directly. The core network 30 may include at least one of, for example, an Evolved Packet Core (EPC), a 5G Core Network (5GCN) and a Next Generation Core (NGC).

The user terminal 20 is a terminal that supports at least one of communication schemes such as LTE, LTE-A and 5G.

The radio communication system 1 may use an Orthogonal Frequency Division Multiplexing (OFDM)-based radio access scheme. For example, on at least one of Downlink (DL) and Uplink (UL), Cyclic Prefix OFDM (CP-OFDM), Discrete Fourier Transform Spread OFDM (DFT-s-OFDM), Orthogonal Frequency Division Multiple Access (OFDMA) and Single Carrier Frequency Division Multiple Access (SC-FDMA) may be used.

The radio access scheme may be referred to as a waveform. In addition, the radio communication system 1 may use another radio access scheme (e.g., another single carrier transmission scheme or another multicarrier transmission scheme) as the radio access scheme on UL and DL.

The radio communication system 1 may use a downlink shared channel (Physical Downlink Shared Channel (PDSCH)) shared by each user terminal 20, a broadcast channel (Physical Broadcast Channel (PBCH)) and a downlink control channel (Physical Downlink Control Channel (PDCCH)) as downlink channels.

Furthermore, the radio communication system 1 may use an uplink shared channel (Physical Uplink Shared Channel (PUSCH)) shared by each user terminal 20, an uplink control channel (Physical Uplink Control Channel (PUCCH)) and a random access channel (Physical Random Access Channel (PRACH)) as uplink channels.

User data, higher layer control information and a System Information Block (SIB) are conveyed on the PDSCH. The user data and the higher layer control information may be conveyed on the PUSCH. Furthermore, a Master Information Block (MIB) may be conveyed on the PBCH.

Lower layer control information may be conveyed on the PDCCH. The lower layer control information may include, for example, Downlink Control Information (DCI) including scheduling information of at least one of the PDSCH and the PUSCH.

In addition, DCI for scheduling the PDSCH may be referred to as, for example, a DL assignment or DL DCI, and DCI for scheduling the PUSCH may be referred to as, for example, a UL grant or UL DCI. In this regard, the PDSCH may be read as DL data, and the PUSCH may be read as UL data.

A COntrol REsource SET (CORESET) and a search space may be used to detect the PDCCH. The CORESET corresponds to a resource for searching DCI. The search space corresponds to a search domain and a search method of PDCCH candidates. One CORESET may be associated with one or a plurality of search spaces. The UE may monitor a CORESET associated with a certain search space based on a search space configuration.

One search space may be associated with a PDCCH candidate corresponding to one or a plurality of aggregation levels. One or a plurality of search spaces may be referred to as a search space set. In addition, a "search space", a "search space set", a "search space configuration", a "search space set configuration", a "CORESET" and a "CORESET configuration" in the present disclosure may be interchangeably read.

Uplink Control Information (UCI) including at least one of Channel State Information (CSI), transmission acknowledgement information (that may be referred to as, for example, Hybrid Automatic Repeat reQuest ACKnowledgement (HARQ-ACK) or ACK/NACK) and a Scheduling Request (SR) may be conveyed on the PUCCH. A random access preamble for establishing connection with a cell may be conveyed on the PRACH.

In addition, downlink and uplink in the present disclosure may be expressed without adding "link" thereto. Furthermore, various channels may be expressed without adding "physical" to heads of the various channels.

The radio communication system 1 may convey a Synchronization Signal (SS) and a Downlink Reference Signal (DL-RS). The radio communication system 1 may convey a Cell-specific Reference Signal (CRS), a Channel State Information Reference Signal (CSI-RS), a DeModulation Reference Signal (DMRS), a Positioning Reference Signal (PRS) and a Phase Tracking Reference Signal (PTRS) as DL-RSs.

The synchronization signal may be at least one of, for example, a Primary Synchronization Signal (PSS) and a Secondary Synchronization Signal (SSS). A signal block including the SS (the PSS or the SSS) and the PBCH (and the DMRS for the PBCH) may be referred to as, for example, an SS/PBCH block or an SS Block (SSB). In addition, the SS and the SSB may be also referred to as reference signals.

Furthermore, the radio communication system 1 may convey a Sounding Reference Signal (SRS) and a DeModulation Reference Signal (DMRS) as UpLink Reference Signals (UL-RSs). In this regard, the DMRS may be referred to as a user terminal-specific reference signal (UE-specific reference signal).

(Base Station)

Figure 4:
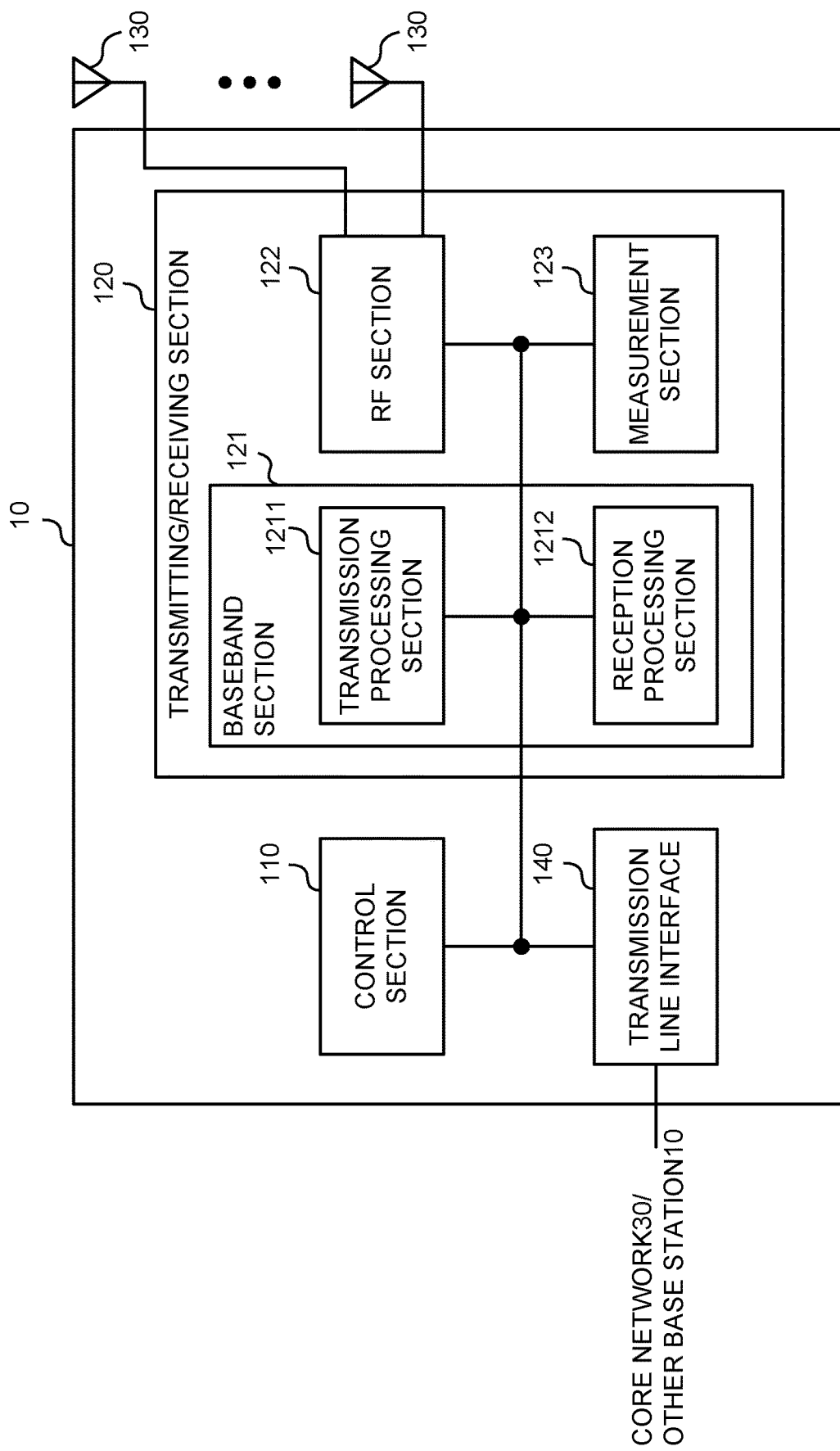
FIG. 4 is a diagram illustrating one example of a configuration of a base station according to the one embodiment.

FIG. 4 is a diagram illustrating one example of a configuration of the base station according to the one embodiment. The base station 10 includes a control section 110, a transmitting/receiving section 120, transmitting/receiving antennas 130 and a transmission line interface 140. In addition, the base station 10 may include one or more of each of the control sections 110, the transmitting/receiving sections 120, the transmitting/receiving antennas 130 and the transmission line interfaces 140.

In addition, this example mainly illustrates function blocks of characteristic portions according to the present embodiment, and may assume that the base station 10 includes other function blocks, too, that are necessary for radio communication. Part of processing of each section described below may be omitted.

The control section 110 controls the entire base station 10. The control section 110 can be composed of a controller or a control circuit described based on the common knowledge in the technical field according to the present disclosure.

The control section 110 may control signal generation and scheduling (e.g., resource allocation or mapping). The control section 110 may control transmission/reception and measurement that use the transmitting/receiving section 120, the transmitting/receiving antennas 130 and the transmission line interface 140. The control section 110 may generate data, control information or a sequence to be transmitted as a signal, and forward the signal to the transmitting/receiving section 120. The control section 110 may perform call processing (such as configuration and release) of a communication channel, state management of the base station 10 and radio resource management.

The transmitting/receiving section 120 may include a baseband section 121, a Radio Frequency (RF) section 122 and a measurement section 123. The baseband section 121 may include a transmission processing section 1211 and a reception processing section 1212. The transmitting/receiving section 120 can be composed of a transmitter/receiver, an RF circuit, a baseband circuit, a filter, a phase shifter, a measurement circuit and a transmitting/receiving circuit described based on the common knowledge in the technical field according to the present disclosure.

The transmitting/receiving section 120 may be composed as an integrated transmitting/receiving section, or may be composed of a transmitting section and a receiving section. The transmitting section may be composed of the transmission processing section 1211 and the RF section 122. The receiving section may be composed of the reception processing section 1212, the RF section 122 and the measurement section 123.

The transmitting/receiving antenna 130 can be composed of an antenna such as an array antenna described based on the common knowledge in the technical field according to the present disclosure.

The transmitting/receiving section 120 may transmit the above-described downlink channel, synchronization signal and downlink reference signal. The transmitting/receiving section 120 may receive the above-described uplink channel and uplink reference signal.

The transmitting/receiving section 120 may form at least one of a transmission beam and a reception beam by using digital beam forming (e.g., precoding) or analog beam forming (e.g., phase rotation).

The transmitting/receiving section 120 (transmission processing section 1211) may perform Packet Data Convergence Protocol (PDCP) layer processing, Radio Link Control (RLC) layer processing (e.g., RLC retransmission control), and Medium Access Control (MAC) layer processing (e.g., HARQ retransmission control) on, for example, the data and the control information obtained from the control section 110, and generate a bit sequence to transmit.

The transmitting/receiving section 120 (transmission processing section 1211) may perform transmission processing such as channel coding (that may include error correction coding), modulation, mapping, filter processing, Discrete Fourier Transform (DFT) processing (when needed), Inverse Fast Fourier Transform (IFFT) processing, precoding and digital-analog conversion on the bit sequence to transmit, and output a baseband signal.

The transmitting/receiving section 120 (RF section 122) may modulate the baseband signal into a radio frequency range, perform filter processing and amplification on the signal, and transmit the signal of the radio frequency range via the transmitting/receiving antennas 130.

On the other hand, the transmitting/receiving section 120 (RF section 122) may perform amplification and filter processing on the signal of the radio frequency range received by the transmitting/receiving antennas 130, and demodulate the signal into a baseband signal.

The transmitting/receiving section 120 (reception processing section 1212) may apply reception processing such as analog-digital conversion, Fast Fourier Transform (FFT) processing, Inverse Discrete Fourier Transform (IDFT) processing (when needed), filter processing, demapping, demodulation, decoding (that may include error correction decoding), MAC layer processing, RLC layer processing and PDCP layer processing to the obtained baseband signal, and obtain user data.

The transmitting/receiving section 120 (measurement section 123) may perform measurement related to the received signal. For example, the measurement section 123 may perform Radio Resource Management (RRM) measurement or Channel State Information (CSI) measurement based on the received signal. The measurement section 123 may measure received power (e.g., Reference Signal Received Power (RSRP)), received quality (e.g., Reference Signal Received Quality (RSRQ), a Signal to Interference plus Noise Ratio (SINR) or a Signal to Noise Ratio (SNR)), a signal strength (e.g., a Received Signal Strength Indicator (RSSI)) or channel information (e.g., CSI). The measurement section 123 may output a measurement result to the control section 110.

The transmission line interface 140 may transmit and receive (backhaul signaling) signals to and from apparatuses and the other base stations 10 included in the core network 30, and obtain and convey user data (user plane data) and control plane data for the user terminal 20.

In addition, the transmitting section and the receiving section of the base station 10 according to the present disclosure may be composed of at least one of the transmitting/receiving section 120, the transmitting/receiving antenna 130 and the transmission line interface 140.

In addition, the transmitting/receiving section 120 may transmit a PDCCH in at least part of spans determined based on a monitoring offset (PDCCH monitoring occasion).

(User Terminal)

Figure 5:
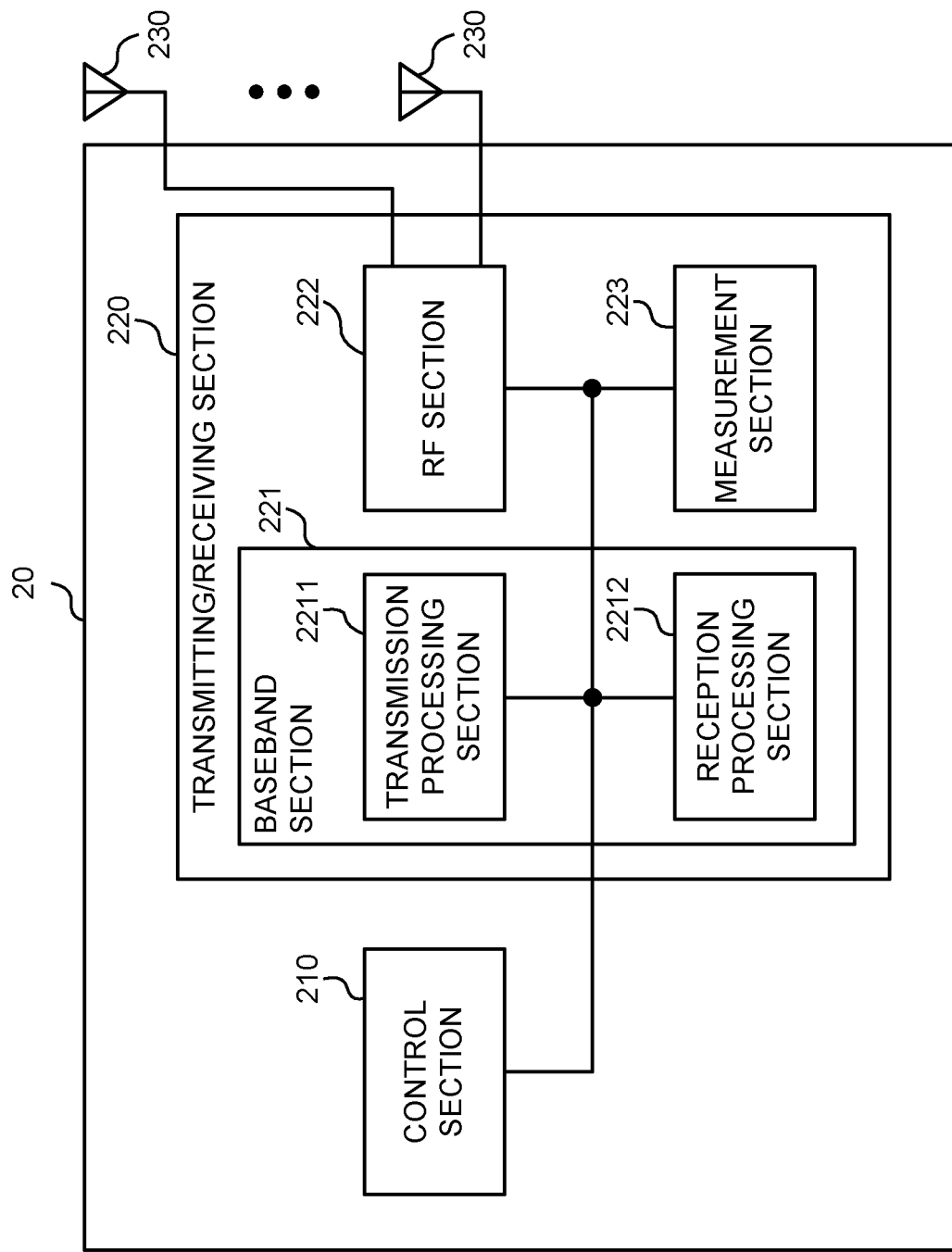
FIG. 5 is a diagram illustrating one example of a configuration of a user terminal according to the one embodiment.

FIG. 5 is a diagram illustrating one example of a configuration of the user terminal according to the one embodiment. The user terminal 20 includes a control section 210, a transmitting/receiving section 220 and transmitting/receiving antennas 230. In this regard, the user terminal 20 may include one or more of each of the control sections 210, the transmitting/receiving sections 220 and the transmitting/receiving antennas 230.

In addition, this example mainly illustrates function blocks of characteristic portions according to the present embodiment, and may assume that the user terminal 20 includes other function blocks, too, that are necessary for radio communication. Part of processing of each section described below may be omitted.

The control section 210 controls the entire user terminal 20. The control section 210 can be composed of a controller or a control circuit described based on the common knowledge in the technical field according to the present disclosure.

The control section 210 may control signal generation and mapping. The control section 210 may control transmission/reception and measurement that use the transmitting/receiving section 220 and the transmitting/receiving antennas 230. The control section 210 may generate data, control information or a sequence to be transmitted as a signal, and forward the signal to the transmitting/receiving section 220.

The transmitting/receiving section 220 may include a baseband section 221, an RF section 222 and a measurement section 223. The baseband section 221 may include a transmission processing section 2211 and a reception processing section 2212. The transmitting/receiving section 220 can be composed of a transmitter/receiver, an RF circuit, a baseband circuit, a filter, a phase shifter, a measurement circuit and a transmitting/receiving circuit described based on the common knowledge in the technical field according to the present disclosure.

The transmitting/receiving section 220 may be composed as an integrated transmitting/receiving section, or may be composed of a transmitting section and a receiving section. The transmitting section may be composed of the transmission processing section 2211 and the RF section 222. The receiving section may be composed of the reception processing section 2212, the RF section 222 and the measurement section 223.

The transmitting/receiving antenna 230 can be composed of an antenna such as an array antenna described based on the common knowledge in the technical field according to the present disclosure.

The transmitting/receiving section 220 may receive the above-described downlink channel, synchronization signal and downlink reference signal. The transmitting/receiving section 220 may transmit the above-described uplink channel and uplink reference signal.

The transmitting/receiving section 220 may form at least one of a transmission beam and a reception beam by using digital beam forming (e.g., precoding) or analog beam forming (e.g., phase rotation).

The transmitting/receiving section 220 (transmission processing section 2211) may perform PDCP layer processing, RLC layer processing (e.g., RLC retransmission control) and MAC layer processing (e.g., HARQ retransmission control) on, for example, the data and the control information obtained from the control section 210, and generate a bit sequence to transmit.

The transmitting/receiving section 220 (transmission processing section 2211) may perform transmission processing such as channel coding (that may include error correction coding), modulation, mapping, filter processing, DFT processing (when needed), IFFT processing, precoding and digital-analog conversion on the bit sequence to transmit, and output a baseband signal.

In this regard, whether or not to apply the DFT processing may be based on a configuration of transform precoding. When transform precoding is enabled for a certain channel (e.g., PUSCH), the transmitting/receiving section 220 (transmission processing section 2211) may perform the DFT processing as the above transmission processing to transmit the certain channel by using a DFT-s-OFDM waveform. When precoding is not enabled, the transmitting/receiving section 220 (transmission processing section 2211) may not perform the DFT processing as the above transmission processing.

The transmitting/receiving section 220 (RF section 222) may modulate the baseband signal into a radio frequency range, perform filter processing and amplification on the signal, and transmit the signal of the radio frequency range via the transmitting/receiving antennas 230.

On the other hand, the transmitting/receiving section 220 (RF section 222) may perform amplification and filter processing on the signal of the radio frequency range received by the transmitting/receiving antennas 230, and demodulate the signal into a baseband signal.

The transmitting/receiving section 220 (reception processing section 2212) may apply reception processing such as analog-digital conversion, FFT processing, IDFT processing (when needed), filter processing, demapping, demodulation, decoding (that may include error correction decoding), MAC layer processing, RLC layer processing and PDCP layer processing to the obtained baseband signal, and obtain user data.

The transmitting/receiving section 220 (measurement section 223) may perform measurement related to the received signal. For example, the measurement section 223 may perform, for example, RRM measurement or CSI measurement based on the received signal. The measurement section 223 may measure, for example, received power (e.g., RSRP), received quality (e.g., RSRQ, an SINR or an SNR), a signal strength (e.g., RSSI) or channel information (e.g., CSI). The measurement section 223 may output a measurement result to the control section 210.

In addition, the transmitting section and the receiving section of the user terminal 20 according to the present disclosure may be composed of at least one of the transmitting/receiving section 220 and the transmitting/receiving antenna 230.

In addition, the control section 210 may determine (such as derive or specify) a span pattern including spans for monitoring a Physical Downlink Control Channel (PDCCH) based on a monitoring offset (PDCCH monitoring occasion).

The transmitting/receiving section 220 may monitor PDCCH candidates based on the span pattern. The control section 210 may determine a span pattern of each component carrier based on an assumption related to span patterns of a plurality of component carriers.

The control section 210 may determine the span pattern of each component carrier based on an assumption that the span patterns of a plurality of these component carriers are the same.

The control section 210 may determine the span pattern of each component carrier based on an assumption that the span patterns of a plurality of these component carriers differ according to a frequency range.

The transmitting/receiving section 220 may transmit capability information related to the number of downlink cells where Physical Downlink Control Channel (PDCCH) candidates can be monitored. The capability information may be capability information that indicates the number of cells supported by Rel. 15 NR, capability information that indicates the number of cells supported by Rel. 16 and subsequent release NR, or capability information (joint capability information) that indicates the number of cells supported by Rel. 15 and 16 and subsequent release NR.

The control section 210 may determine (derive or decide), based on the capability information, the number of cells where PDCCH monitoring can be performed for New Radio (NR) of a second release (e.g., Rel. 16 NR), the number of the cells being different from the number of cells where PDCCH monitoring can be performed for NR of a first release (e.g., Rel. 15 NR).

(Hardware Configuration)

In addition, the block diagrams used to describe the above embodiments illustrate blocks in function units. These function blocks (components) are realized by an arbitrary combination of at least ones of hardware components and software components. Furthermore, a method for realizing each function block is not limited in particular. That is, each function block may be realized by using one physically or logically coupled apparatus or may be realized by connecting two or more physically or logically separate apparatuses directly or indirectly (by using, for example, wired connection or radio connection) and using a plurality of these apparatuses. Each function block may be realized by combining software with the above one apparatus or a plurality of above apparatuses.

In this regard, the functions include deciding, determining, judging, calculating, computing, processing, deriving, investigating, looking up, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, and assigning, yet are not limited to these. For example, a function block (component) that causes transmission to function may be referred to as, for example, a transmitting unit or a transmitter. As described above, the method for realizing each function block is not limited in particular.

Figure 6:
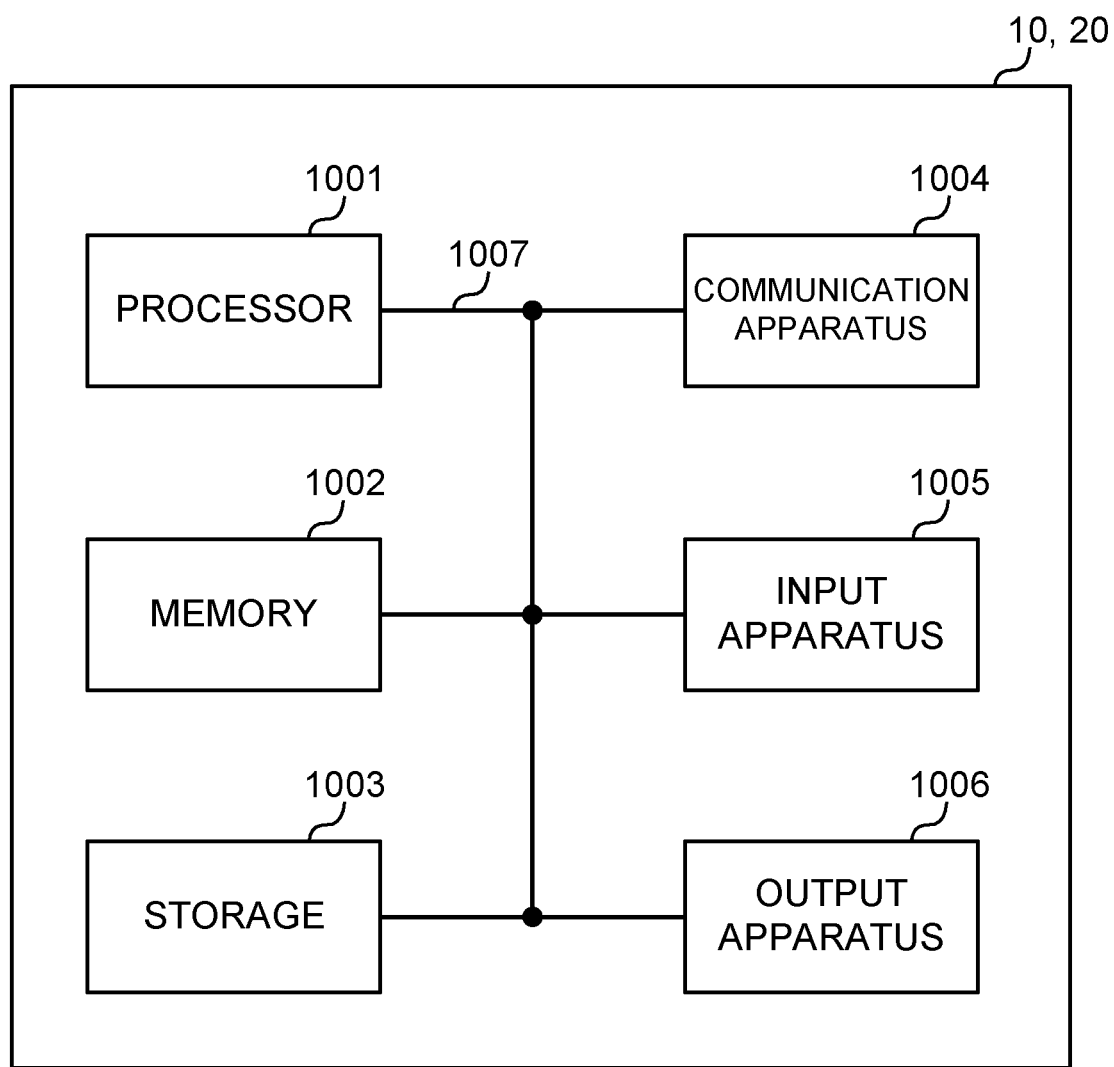
FIG. 6 is a diagram illustrating one example of hardware configurations of the base station and the user terminal according to the one embodiment.

For example, the base station and the user terminal according to the one embodiment of the present disclosure may function as computers that perform processing of the radio communication method according to the present disclosure. FIG. 6 is a diagram illustrating one example of the hardware configurations of the base station and the user terminal according to the one embodiment. The above-described base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, words such as an apparatus, a circuit, a device, a section and a unit in the present disclosure can be interchangeably read. The hardware configurations of the base station 10 and the user terminal 20 may be configured to include one or a plurality of apparatuses illustrated in FIG. 6 or may be configured without including part of the apparatuses.

For example, FIG. 6 illustrates the only one processor 1001. However, there may be a plurality of processors. Furthermore, processing may be executed by 1 processor or processing may be executed by 2 or more processors simultaneously or successively or by using another method. In addition, the processor 1001 may be implemented by 1 or more chips.

Each function of the base station 10 and the user terminal 20 is realized by, for example, causing hardware such as the processor 1001 and the memory 1002 to read given software (program), and thereby causing the processor 1001 to perform an operation, and control communication via the communication apparatus 1004 and control at least one of reading and writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, at least part of the above-described control section 110 (210) and transmitting/receiving section 120 (220) may be realized by the processor 1001.

Furthermore, the processor 1001 reads programs (program codes), software modules or data from at least one of the storage 1003 and the communication apparatus 1004 out to the memory 1002, and executes various types of processing according to these programs, software modules or data. As the programs, programs that cause the computer to execute at least part of the operations described in the above-described embodiments are used. For example, the control section 110 (210) may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as, for example, a register, a cache or a main memory (main storage apparatus). The memory 1002 can store programs (program codes) and software modules that can be executed to perform the radio communication method according to the one embodiment of the present disclosure.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmitting/receiving device) that performs communication between computers via at least one of a wired network and a radio network, and is also referred to as, for example, a network device, a network controller, a network card and a communication module. The communication apparatus 1004 may be configured to include a high frequency switch, a duplexer, a filter and a frequency synthesizer to realize at least one of, for example, Frequency Division Duplex (FDD) and Time Division Duplex (TDD). For example, the above-described transmitting/receiving section 120 (220) and transmitting/receiving antennas 130 (230) may be realized by the communication apparatus 1004. The transmitting/receiving section 120 (220) may be physically or logically separately implemented as a transmitting section 120a (220a) and a receiving section 120b (220b).

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using different buses between apparatuses.

Furthermore, the base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or entirety of each function block. For example, the processor 1001 may be implemented by using at least one of these hardware components.

Modified Example

In addition, each term that has been described in the present disclosure and each term that is necessary to understand the present disclosure may be replaced with terms having identical or similar meanings. For example, a channel, a symbol and a signal (a signal or a signaling) may be interchangeably read. Furthermore, a signal may be a message. A reference signal can be also abbreviated as an RS, or may be referred to as a pilot or a pilot signal depending on standards to be applied. Furthermore, a Component Carrier (CC) may be referred to as, for example, a cell, a frequency carrier and a carrier frequency.

A radio frame may include one or a plurality of durations (frames) in a time domain. Each of one or a plurality of durations (frames) that makes up a radio frame may be referred to as a subframe. Furthermore, the subframe may include one or a plurality of slots in the time domain. The subframe may be a fixed time duration (e.g., 1 ms) that does not depend on a numerology.

In this regard, the numerology may be a communication parameter to be applied to at least one of transmission and reception of a certain signal or channel. The numerology may indicate at least one of, for example, a SubCarrier Spacing (SCS), a bandwidth, a symbol length, a cyclic prefix length, a Transmission Time Interval (TTI), the number of symbols per TTI, a radio frame configuration, specific filtering processing performed by a transceiver in a frequency domain, and specific windowing processing performed by the transceiver in a time domain.

The slot may include one or a plurality of symbols (Orthogonal Frequency Division Multiplexing (OFDM) symbols or Single Carrier Frequency Division Multiple Access (SC-FDMA) symbols) in the time domain. Furthermore, the slot may be a time unit based on the numerology.

The slot may include a plurality of mini slots. Each mini slot may include one or a plurality of symbols in the time domain. Furthermore, the mini slot may be referred to as a subslot. The mini slot may include a smaller number of symbols than that of the slot. The PDSCH (or the PUSCH) to be transmitted in larger time units than that of the mini slot may be referred to as a PDSCH (PUSCH) mapping type A. The PDSCH (or the PUSCH) to be transmitted by using the mini slot may be referred to as a PDSCH (PUSCH) mapping type B.

The radio frame, the subframe, the slot, the mini slot and the symbol each indicate a time unit for conveying signals. The other corresponding names may be used for the radio frame, the subframe, the slot, the mini slot and the symbol.

In addition, time units such as a frame, a subframe, a slot, a mini slot and a symbol in the present disclosure may be interchangeably read.

For example, 1 subframe may be referred to as a TTI, a plurality of contiguous subframes may be referred to as TTIs, or 1 slot or 1 mini slot may be referred to as a TTI. That is, at least one of the subframe and the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as, for example, a slot or a mini slot instead of a subframe.

In this regard, the TTI refers to, for example, a minimum time unit of scheduling of radio communication. For example, in the LTE system, the base station performs scheduling for allocating radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block or code word, or may be a processing unit of scheduling or link adaptation. In addition, when the TTI is given, a time period (e.g., the number of symbols) in which a transport block, a code block or a code word is actually mapped may be shorter than the TTI.

In addition, in a case where 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that make up a minimum time unit of the scheduling may be controlled.

The TTI having the time duration of 1 ms may be referred to as, for example, a general TTI (TTIs according to 3GPP Rel. 8 to 12), a normal TTI, a long TTI, a general subframe, a normal subframe, a long subframe or a slot. A TTI shorter than the general TTI may be referred to as, for example, a reduced TTI, a short TTI, a partial or fractional TTI, a reduced subframe, a short subframe, a mini slot, a subslot or a slot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms. A Resource Block (RB) is a resource allocation unit of the time domain and the frequency domain, and may include one or a plurality of contiguous subcarriers in the frequency domain. The numbers of subcarriers included in RBs may be the same irrespectively of a numerology, and may be, for example, 12. The numbers of subcarriers included in the RBs may be determined based on the numerology.

Furthermore, the RB may include one or a plurality of symbols in the time domain or may have the length of 1 slot, 1 mini slot, 1 subframe or 1 TTI. 1 TTI or 1 subframe may each include one or a plurality of resource blocks.

In this regard, one or a plurality of RBs may be referred to as, for example, a Physical Resource Block (Physical RB (PRB)), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

A Bandwidth Part (BWP) (that may be referred to as, for example, a partial bandwidth) may mean a subset of contiguous common Resource Blocks (common RBs) for a certain numerology in a certain carrier. In this regard, the common RB may be specified by an RB index based on a common reference point of the certain carrier. A PRB may be defined based on a certain BWP, and may be numbered in the certain BWP.

The BWP may include a UL BWP (a BWP for UL) and a DL BWP (a BWP for DL). One or a plurality of BWPs in 1 carrier may be configured to the UE.

At least one of the configured BWPs may be active, and the UE may not assume to transmit and receive given signals/channels outside the active BWP. In addition, a "cell" and a "carrier" in the present disclosure may be read as a "BWP".

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and the parameters described in the present disclosure may be expressed by using absolute values, may be expressed by using relative values with respect to given values or may be expressed by using other corresponding information. For example, a radio resource may be instructed by a given index.

Names used for parameters in the present disclosure are in no respect restrictive names. Furthermore, numerical expressions that use these parameters may be different from those explicitly disclosed in the present disclosure. Various channels (such as the PUCCH and the PDCCH) and information elements can be identified based on various suitable names. Therefore, various names assigned to these various channels and information elements are in no respect restrictive names.

The information and the signals described in the present disclosure may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or arbitrary combinations of these.

Furthermore, the information and the signals can be output at least one of from a higher layer to a lower layer and from the lower layer to the higher layer. The information and the signals may be input and output via a plurality of network nodes.

The input and output information and signals may be stored in a specific location (e.g., memory) or may be managed by using a management table. The information and signals to be input and output can be overridden, updated or additionally written. The output information and signals may be deleted. The input information and signals may be transmitted to other apparatuses.

Notification of information is not limited to the aspect/embodiments described in the present disclosure and may be performed by using other methods. For example, the information may be notified in the present disclosure by a physical layer signaling (e.g., Downlink Control Information (DCI) and Uplink Control Information (UCI)), a higher layer signaling (e.g., a Radio Resource Control (RRC) signaling, broadcast information (such as a Master Information Block (MIB) and a System Information Block (SIB)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be given implicitly (by, for example, not giving notification of the given information or by giving notification of another information).

Judgement may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or is referred to as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using at least ones of wired techniques (e.g., coaxial cables, optical fiber cables, twisted pairs and Digital Subscriber Lines (DSLs)) and radio techniques (e.g., infrared rays and microwaves), at least ones of these wired techniques and radio techniques are included in a definition of the transmission media.

The terms "system" and "network" used in the present disclosure can be interchangeably used. The "network" may mean an apparatus (e.g., base station) included in the network.

In the present disclosure, terms such as "precoding", a "precoder", a "weight (precoding weight)", "Quasi-Co-Location (QCL)", a "Transmission Configuration Indication state (TCI state)", a "spatial relation", a "spatial domain filter", "transmission power", "phase rotation", an "antenna port", an "antenna port group", a "layer", "the number of layers", a "rank", a "resource", a "resource set", a "resource group", a "beam", a "beam width", a "beam angle", an "antenna", an "antenna element" and a "panel" can be interchangeably used.

In the present disclosure, terms such as a "Base Station (BS)", a "radio base station", a "fixed station", a "NodeB", an "eNodeB (eNB)", a "gNodeB (gNB)", an "access point", a "Transmission Point (TP)", a "Reception Point (RP)", a "Transmission/Reception Point (TRP)", a "panel", a "cell", a "sector", a "cell group", a "carrier" and a "component carrier" can be interchangeably used. The base station is also referred to as terms such as a macro cell, a small cell, a femtocell or a picocell.

The base station can accommodate one or a plurality of (e.g., three) cells. When the base station accommodates a plurality of cells, an entire coverage area of the base station can be partitioned into a plurality of smaller areas. Each smaller area can also provide a communication service via a base station subsystem (e.g., indoor small base station (Remote Radio Head (RRH))). The term "cell" or "sector" indicates part or the entirety of the coverage area of at least one of the base station and the base station subsystem that provide a communication service in this coverage.

In the present disclosure, the terms such as "Mobile Station (MS)", "user terminal", "user apparatus (UE: User Equipment)" and "terminal" can be interchangeably used.

The mobile station is also referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

At least one of the base station and the mobile station may be referred to as, for example, a transmitting apparatus, a receiving apparatus or a radio communication apparatus. In addition, at least one of the base station and the mobile station may be, for example, a device mounted on a movable body or the movable body itself. The movable body may be a vehicle (e.g., a car or an airplane), may be a movable body (e.g., a drone or a self-driving car) that moves unmanned or may be a robot (a manned type or an unmanned type). In addition, at least one of the base station and the mobile station includes an apparatus, too, that does not necessarily move during a communication operation. For example, at least one of the base station and the mobile station may be an Internet of Things (IoT) device such as a sensor.

Furthermore, the base station in the present disclosure may be read as the user terminal. For example, each aspect/embodiment of the present disclosure may be applied to a configuration where communication between the base station and the user terminal is replaced with communication between a plurality of user terminals (that may be referred to as, for example, Device-to-Device (D2D) or Vehicle-to-Everything (V2X)). In this case, the user terminal 20 may be configured to include the functions of the above-described base station 10. Furthermore, words such as "uplink" and "downlink" may be read as a word (e.g., a "side") that matches terminal-to-terminal communication. For example, the uplink channel and the downlink channel may be read as side channels.

Similarly, the user terminal in the present disclosure may be read as the base station. In this case, the base station 10 may be configured to include the functions of the above-described user terminal 20.

In the present disclosure, operations performed by the base station are performed by an upper node of this base station depending on cases. Obviously, in a network including one or a plurality of network nodes including the base stations, various operations performed to communicate with a terminal can be performed by base stations, one or more network nodes (that are regarded as, for example, Mobility Management Entities (MMES) or Serving-Gateways (S-GWs), yet are not limited to these) other than the base stations or a combination of these.

Each aspect/embodiment described in the present disclosure may be used alone, may be used in combination or may be switched and used when carried out. Furthermore, orders of the processing procedures, the sequences and the flowchart according to each aspect/embodiment described in the present disclosure may be rearranged unless contradictions arise. For example, the method described in the present disclosure presents various step elements by using an exemplary order and is not limited to the presented specific order.

Each aspect/embodiment described in the present disclosure may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New-Radio Access Technology (RAT), New Radio (NR), New radio access (NX), Future generation radio access (FX), the Global System for Mobile communications (GSM (registered trademark)), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods, or next-generation systems that are enhanced based on these systems. Furthermore, a plurality of systems may be combined (for example, LTE or LTE-A and 5G may be combined) and applied.

The phrase "based on" used in the present disclosure does not mean "based only on" unless specified otherwise. In other words, the phrase "based on" means both of "based only on" and "based at least on".

Every reference to elements that use names such as "first" and "second" used in the present disclosure does not generally limit the quantity or the order of these elements. These names can be used in the present disclosure as a convenient method for distinguishing between two or more elements. Hence, the reference to the first and second elements does not mean that only two elements can be employed or the first element should precede the second element in some way.

The term "deciding (determining)" used in the present disclosure includes diverse operations in some cases. For example, "deciding (determining)" may be considered to "decide (determine)" judging, calculating, computing, processing, deriving, investigating, looking up, search and inquiry (e.g., looking up in a table, a database or another data structure), and ascertaining.

Furthermore, "deciding (determining)" may be considered to "decide (determine)" receiving (e.g., receiving information), transmitting (e.g., transmitting information), input, output and accessing (e.g., accessing data in a memory).

Furthermore, "deciding (determining)" may be considered to "decide (determine)" resolving, selecting, choosing, establishing and comparing. That is, "deciding (determining)" may be considered to "decide (determine)" some operation.

Furthermore, "deciding (determining)" may be read as "assuming", "expecting" and "considering".

"Maximum transmit power" disclosed in the present disclosure may mean a maximum value of transmit power, may mean the nominal UE maximum transmit power, or may mean the rated UE maximum transmit power.

The words "connected" and "coupled" used in the present disclosure or every modification of these words can mean every direct or indirect connection or coupling between 2 or more elements, and can include that 1 or more intermediate elements exist between the two elements "connected" or "coupled" with each other. The elements may be coupled or connected physically or logically or by a combination of these physical and logical connections. For example, "connection" may be read as "access".

It can be understood in the present disclosure that, when connected, the two elements are "connected" or "coupled" with each other by using 1 or more electric wires, cables or printed electrical connection, and by using electromagnetic energy having wavelengths in radio frequency domains, microwave domains or (both of visible and invisible) light domains in some non-restrictive and non-comprehensive examples.

A sentence that "A and B are different" in the present disclosure may mean that "A and B are different from each other". In this regard, the sentence may mean that "A and B are each different from C". Words such as "separate" and "coupled" may be also interpreted in a similar way to "different".

In a case where the words "include" and "including" and modifications of these words are used in the present disclosure, these words intend to be comprehensive similar to the word "comprising". Furthermore, the word "or" used in the present disclosure intends to not be an exclusive OR.

In a case where, for example, translation adds articles such as a, an and the in English in the present disclosure, the present disclosure may include that nouns coming after these articles are plural.

The invention according to the present disclosure has been described in detail above. However, it is obvious for a person skilled in the art that the invention according to the present disclosure is not limited to the embodiments described in the present disclosure. The invention according to the present disclosure can be carried out as modified and changed aspects without departing from the gist and the scope of the invention defined based on the recitation of the claims. Accordingly, the description of the present disclosure is intended for exemplary explanation, and does not bring any restrictive meaning to the invention according to the present disclosure.

The present application is based on Japanese Patent Application No. 2019-190156 filed on Oct. 17, 2019, entire content of which is incorporated by reference herein.

The invention claimed is:

1. A terminal comprising:
a transmitter that transmits capability information indicating, in a joint manner, the number of downlink cells capable of physical downlink control channel (PDCCH) monitoring for new radio (NR) of a first release and the number of downlink cells capable of PDCCH monitoring for NR of a second release;
a processor that determines, based on radio resource control (RRC) signaling, that a maximum number of non-overlapped control channel elements (CCEs) per serving cell is a maximum number of non-overlapped CCEs per u and span, for a subcarrier spacing (SCS) configuration of $\mu \leq 1$; and
a receiver that monitors, based on the maximum number of non-overlapped CCEs per serving cell, PDCCH candidates per span.

2. A radio communication method for a terminal, comprising:
transmitting capability information indicating, in a joint manner, the number of downlink cells capable of physical downlink control channel (PDCCH) monitoring for new radio (NR) of a first release and the number of downlink cells capable of PDCCH monitoring for NR of a second release;
determining, based on radio resource control (RRC) signaling, that a maximum number of non-overlapped control channel elements (CCEs) per serving cell is a maximum number of non-overlapped CCEs per u and span, for a subcarrier spacing (SCS) configuration of $\mu \leq 1$; and
monitoring, based on the maximum number of non-overlapped CCEs per serving cell, PDCCH candidates per span.

3. A system comprising a terminal and a base station, wherein the terminal comprises:
- a transmitter that transmits capability information indicating, in a joint manner, the number of downlink cells capable of physical downlink control channel (PDCCH) monitoring for new radio (NR) of a first release and the number of downlink cells capable of PDCCH monitoring for NR of a second release;
- a processor that determines, based on radio resource control (RRC) signaling, that a maximum number of non-overlapped control channel elements (CCEs) per serving cell is a maximum number of non-overlapped CCEs per u and span, for a subcarrier spacing (SCS) configuration of $\mu \leq 1$; and
- a receiver that monitors, based on the maximum number of non-overlapped CCEs per serving cell, PDCCH candidates per span, and the base station comprises a transmitter that transmits the RRC signaling.

\* \* \* \* \*